United States Patent
Han et al.

(10) Patent No.: US 10,723,871 B2
(45) Date of Patent: Jul. 28, 2020

(54) ETHYLENE/ALPHA-OLEFIN/DIENE INTERPOLYMER

(71) Applicant: Dow Global Technologies LLC, Midland, MI (US)

(72) Inventors: Tao Han, Shanghai (CN); Colin LiPiShan, Pearland, TX (US); Timothy E. Clayfield, Cham (CH)

(73) Assignee: Dow Global Technologies LLC, Midland, MI (US)

( * ) Notice: Subject to any disclaimer, the term of this patent is extended or adjusted under 35 U.S.C. 154(b) by 49 days.

(21) Appl. No.: 16/306,111

(22) PCT Filed: May 30, 2017

(86) PCT No.: PCT/US2017/035012
§ 371 (c)(1),
(2) Date: Nov. 30, 2018

(87) PCT Pub. No.: WO2017/210195
PCT Pub. Date: Dec. 7, 2017

(65) Prior Publication Data
US 2019/0136029 A1     May 9, 2019

(30) Foreign Application Priority Data
May 30, 2016   (WO) ................ PCT/CN2016/083875

(51) Int. Cl.
*C08L 23/16*     (2006.01)
*C08F 210/18*    (2006.01)

(52) U.S. Cl.
CPC ............ *C08L 23/16* (2013.01); *C08F 210/18* (2013.01); *C08L 2205/025* (2013.01)

(58) Field of Classification Search
CPC .. C08L 23/16; C08L 2205/025; C08F 210/18; C08F 210/06; C08F 236/20; C08F 4/64193; C08F 2500/04; C08F 2500/17
See application file for complete search history.

(56) References Cited

U.S. PATENT DOCUMENTS

| | | | |
|---|---|---|---|
| 5,698,651 A | 12/1997 | Kawasaki et al. | |
| 5,919,988 A | 7/1999 | Pazos et al. | |
| 5,973,017 A | 10/1999 | Okita et al. | |
| 5,977,251 A | 11/1999 | Kao et al. | |
| 6,319,998 B1 | 11/2001 | Cozewith et al. | |
| 6,331,600 B1 | 12/2001 | Galimberti et al. | |
| 6,545,088 B1 | 4/2003 | Kolthammer et al. | |
| 6,686,419 B2 | 2/2004 | Wouters et al. | |
| 8,299,189 B2 | 10/2012 | Boone et al. | |
| 8,354,484 B2 | 1/2013 | Konze et al. | |
| 8,450,438 B2 | 5/2013 | Aboelella et al. | |
| 9,422,383 B2 | 8/2016 | LiPiShan et al. | |
| 10,160,819 B2 | 12/2018 | LiPiShan et al. | |
| 10,160,841 B2 | 12/2018 | LiPiShan et al. | |
| 10,239,974 B2 | 3/2019 | Kapur et al. | |
| 2003/0162926 A1 | 8/2003 | Wouters et al. | |
| 2008/0064818 A1 | 3/2008 | Murakami et al. | |
| 2011/0160323 A1 | 6/2011 | Liang et al. | |
| 2012/0059123 A1 | 3/2012 | Nakano | |
| 2013/0316111 A1 | 11/2013 | Wu et al. | |
| 2014/0336290 A1 | 11/2014 | Jourdain | |
| 2015/0080522 A1 | 3/2015 | Tang et al. | |
| 2015/0259491 A1 | 9/2015 | LiPiShan et al. | |
| 2015/0274867 A1 | 10/2015 | LiPiShan et al. | |
| 2015/0322185 A1 | 11/2015 | Li Pi Shan | |
| 2017/0101493 A1 | 4/2017 | Fontaine et al. | |
| 2017/0101494 A1 | 4/2017 | Fontaine et al. | |
| 2017/0292013 A1* | 10/2017 | Blok et al. ............ | B60C 1/0016 |

FOREIGN PATENT DOCUMENTS

EP       708117       4/1996

OTHER PUBLICATIONS

PCT/CN2016/083875, International Search Report and Written Opinion dated Mar. 3, 2017.
PCT/US2017/035012, International Search Report and Written Opinion dated Aug. 9, 2017.
PCT/US2017/035012, International Preliminary Report on Patentability dated Dec. 4, 2018.

* cited by examiner

Primary Examiner — Nathan M Nutter
(74) Attorney, Agent, or Firm — Cheney Huang

(57) ABSTRACT

The invention provides a composition comprising a first composition, comprises a first ethylene/alpha-olefin/non-conjugated diene interpolymer, and wherein the first composition comprises the following properties: a) a molecular weight distribution MWD(conv)≥3.50, and b) a [(Mz)/(tan delta (0.1 rad/sec, 190° C.))]≥250,000 g/mole.

10 Claims, 1 Drawing Sheet

ETHYLENE/ALPHA-OLEFIN/DIENE INTERPOLYMER

REFERENCE TO RELATED APPLICATIONS

This application claims the benefit of International Application PCT/CN16/083875, filed May 30, 2016, and incorporated herein by reference.

BACKGROUND

There is a need today for new EPDM resins that have improved properties, such as melt elasticity, mixing performance, processability, high curing speed and good curing efficiency, as compared to conventional EPDM-based compositions Conventional EPDM-based compositions are described in the following references: U.S. Pat. Nos. 5,973,017, 5,698,651, 6,686,419, 6,319,998, 6,331,600, US20080064818, US20140336290, US20120059123, US20110160323, WO2007/136494, WO2007/136496, WO2007/136497, WO2013/096573, WO2007136494, WO2014/084892, WO2014/084893, WO2014/084892, WO2016/003878, WO2016/003879, WO2016/003880, EP708117A1, However, there is a need for new compositions that have excellent melt elasticity, compound mixing, processability, and good curing properties. This need has been met by the following invention.

SUMMARY OF INVENTION

The invention provides a composition comprising a first composition, which comprises a first ethylene/alpha-olefin/non-conjugated diene interpolymer, and wherein the first composition comprises the following properties:
a) a molecular weight distribution MWD(conv)≥3.50, and
b) a [(Mz)/(tan delta (0.1 rad/sec, 190° C.))]≥250,000 g/mole.

DETAILED DESCRIPTION

Figure 1:
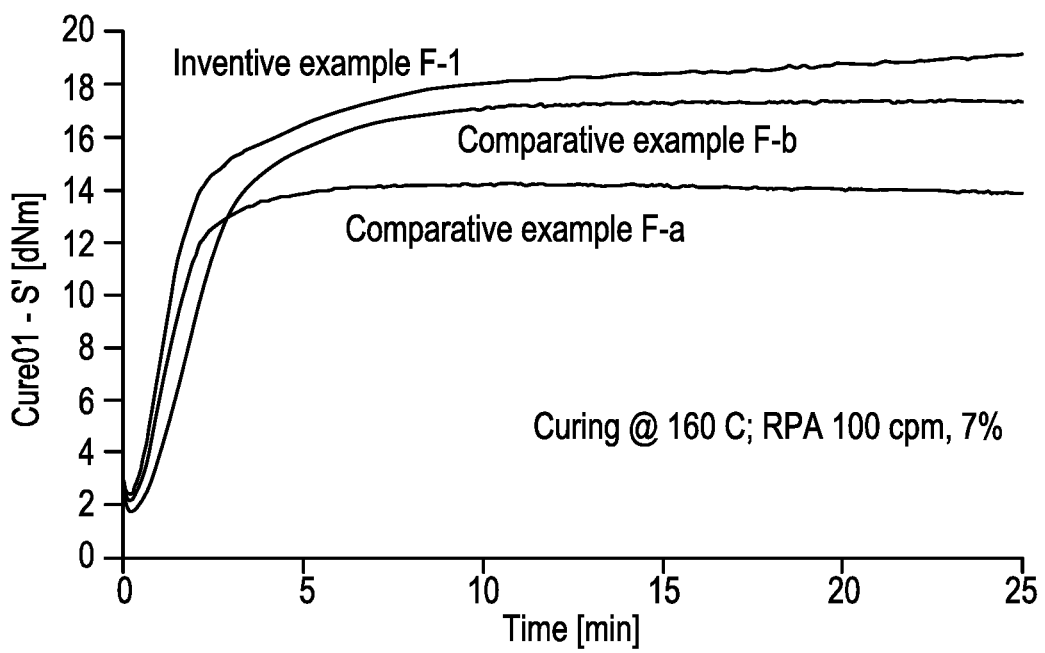
FIG. 1 depicts the curing profiles of an inventive composition and comparative compositions, each cured by RPA, at 160° C. for 25 minutes.

New ethylene/alpha-olefin/non-conjugated diene interpolymer compositions have been discovered that provide a low viscosity amorphous interpolymer molecular design (amorphous, long chain branched interpolymers as described herein). The interpolymer has high flowability, fast cure rate, fast property build, high green strength and low iridescence, to meet current needs for faster rubber extrusion processes and faster injection molding processes.

As discussed above, the invention provides a composition comprising a first composition, which comprises a first ethylene/alpha-olefin/non-conjugated diene interpolymer, and wherein the first composition comprises the following properties:
a) a molecular weight distribution MWD(conv)≥3.50, and
b) a [(Mz)/(tan delta (0.1 rad/sec, 190° C.))]≥250,000 g/mole. Mz is determined from conventional GPC.

The inventive composition may comprise a combination of two or more embodiments described herein.

The first composition may comprise a combination of two or more embodiments described herein.

The first ethylene/α-olefin/non-conjugated diene may comprise a combination of two or more embodiments described herein.

In one embodiment, or in combination with any one or more embodiments described herein, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, or in combination with any one or more embodiments described herein, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a molecular weight distribution MWD(conv)≥3.55, or ≥3.60, or ≥3.70, or ≥3.80, or ≥3.90 or ≥4.00, or ≥4.10, or ≥4.20, or ≥4.30, or ≥4.40, or ≥4.50. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt %, or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a molecular weight distribution MWD(conv)≥4.60, or ≥4.70, or ≥4.80, or ≥4.90, or ≥5.00. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a molecular weight distribution MWD(conv)≤9.00, or ≤8.50, or ≤8.00, or ≤7.50, or ≤7.00, or ≤6.50. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a [(Mz)/(tan delta (0.1 rad/sec, 190° C.))]≥255,000 g/mole, or ≥260,000 g/mole, or ≥270,000 g/mole, or ≥280,000 g/mole, or ≥290,000 g/mole, or ≥300,000 g/mole, or ≥310,000 g/mole, or ≥320,000 g/mole, or ≥330,000 g/mole, or ≥340,000 g/mole, or ≥350,000 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a [(Mz)/(tan delta (0.1 rad/sec, 190° C.))]≥360,000 g/mole, or ≥380,000 g/mole, or ≥400,000 g/mole, or ≥420,000 g/mole, or ≥440,000 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a [(Mz)/(tan delta (0.1 rad/sec, 190° C.))]≥450,000 g/mole, or ≥460,000 g/mole, or ≥470,000 g/mole, or ≥480,000 g/mole, or ≥490,000 g/mole, ≥500,000 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a [(Mz)/(tan delta (0.1 rad/sec, 190° C.))]≤1,000,000 g/mole, or ≤950,000 g/mole, or ≤900,000 g/mole, or ≤850,000 g/mole, or ≤800,000 g/mole, ≤750,000 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a MV (ML1+4, 125° C.)≤55, or ≤50, or ≤45, or ≤40, or ≤35. Mooney viscosity is that of the first composition without filler and without oil. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a MV (ML1+4, 125° C.)≥10, or ≥15, or ≥20, or ≥25. Mooney viscosity is that of the first composition without filler and without oil. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a tan delta (0.1 rad/sec, 190° C.)≥0.90, or ≥0.95, or ≥1.00, or ≥1.05, or ≥1.10, ≥1.15, or ≥1.20. In a further embodiment, the first composition comprises ≥95 wt %, or ≥96 wt % or ≥97 wt %, or ≥98%, or ≥99 wt % of the sum of first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a tan delta (0.1 rad/sec, 190° C.)≤2.00, or ≤1.95, or ≤1.90, or ≤1.85, or ≤1.80, or ≤1.75, or ≤1.70, or ≤1.65, or ≤1.60. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a tan delta (0.1 rad/sec, 190° C.)] from 0.90 to 1.60, or from 0.95 to 1.55, or from 1.00 to 1.50, or from 1.05 to 1.45, or from 1.10 to 1.40, or from 1.15 to 1.35. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a [(Mz)/(tan delta (0.1 rad/sec, 190° C.))]/(MV (ML1+4, 125° C.)≥9,000 g/mole, or ≥9,200 g/mole, or ≥9,400 g/mole, or ≥9,600 g/mole, or ≥9,800 g/mole, or ≥10,000 g/mole, or ≥10,200 g/mole, or ≥10,400 g/mole, or ≥10,600 g/mole, or ≥10,800 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a [(Mz)/(tan delta (0.1 rad/sec, 190° C.))]/(MV (ML1+4, 125° C.)≤24,000 g/mole, or ≤23,500 g/mole, or ≤23,000 g/mole, or ≤22,500 g/mole, or ≤22,000 g/mole, or ≤21,500 g/mole, or ≤21,000 g/mole, or ≤20,500 g/mole, or ≤20,000 g/mole. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition. Mz is determined from conventional GPC.

In one embodiment, or in combination with any one or more embodiments described herein, the first composition has a rheology ratio RR=[V (0.1 rad/sec, 190° C.)/V (100 rad/sec, 190° C.)]≥15, or ≥18, or ≥20, or ≥22, or ≥24, or ≥26. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a rheology ratio RR=[V (0.1 rad/sec, 190° C.)/V (100 rad/sec, 190° C.)]≤50, or ≤48, or ≤46, or ≤44, or ≤42, or ≤40, or ≤38, or ≤36, or ≤35. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, ≥99 wt % of the first ethylene/-alpha-olefin/non-conjugated diene interpolymer, based on the weight of the first composition.

In one embodiment, or in combination with any one or more embodiments described herein, the first composition comprises the first ethylene/alpha-olefin/non-conjugated diene interpolymer and a second ethylene/alpha-olefin/non-conjugated diene, and the first composition has a diene content from 6.0 to 10.0 wt %, or from 6.5 to 9.5 wt %, or from 7.0 to 9.0 wt %, based on the sum weight of two interpolymers. In a further embodiment, the alpha-olefin of the second interpolymer is the same alpha-olefin of the first interpolymer. In a further embodiment, the first composition comprises ≥95 wt %, or ≥96 wt % or ≥97 wt %, or ≥98%, ≥99 wt % of the sum of first ethylene/alpha-olefin/non-conjugated diene interpolymer and the second ethylene/alpha-olefin/non-conjugated diene interpolymer, based on the weight of the first composition.

In one embodiment, or in combination with any one or more embodiments described herein, the first composition comprises the first ethylene/alpha-olefin/non-conjugated diene interpolymer and a second ethylene/alpha-olefin/non-conjugated diene, and the first composition has an ethylene content from 40 to 70 wt %, or from 45 to 65 wt %, or from 50 to 60 wt %, based on the sum weight of two interpolymers. In a further embodiment, the alpha-olefin of the second interpolymer is the same alpha-olefin of the first interpolymer. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and the second ethylene/alpha-olefin/non-conjugated diene interpolymer, based on the weight of the first composition.

In one embodiment, or in combination with any one or more embodiments described herein, the first composition comprises the first ethylene/alpha-olefin/non-conjugated diene interpolymer and a second ethylene/alpha-olefin/non-conjugated diene, and the first composition has an alpha-olefin content from 30 to 50 wt %, or from 35 to 45 wt %, or from 30 to 40 wt %, based on the sum weight of two interpolymers. In a further embodiment, the alpha-olefin of the second interpolymer is the same alpha-olefin of the first interpolymer. In a further embodiment, the first composition comprises ≥95 wt %, or ≥96 wt % or ≥97 wt %, or ≥98%, ≥99 wt % of the sum of the first ethylene/alpha-olefin/non-conjugated diene interpolymer and the second ethylene/alpha-olefin/non-conjugated diene interpolymer, based on the weight of the first composition.

In one embodiment, or in combination with any one or more embodiments described herein, the first composition comprises the first ethylene/alpha-olefin/non-conjugated diene interpolymer and a second ethylene/alpha-olefin/non-conjugated diene, and wherein the weight ratio of the first interpolymer to the second interpolymer is from 0.40 to 0.80, or from 0.45 to 0.75, or from 0.50 to 0.70. In a further embodiment, the alpha-olefin of the second interpolymer is the same alpha-olefin of the first interpolymer. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and the second ethylene/alpha-olefin/non-conjugated diene interpolymer, based on the weight of the first composition.

In one embodiment, or in combination with any one or more embodiments described herein, the first composition comprises one ethylene/alpha-olefin/non-conjugated diene interpolymer (first interpolymer), and has a diene content from 6.0 to 10.0 wt %, or from 6.5 to 9.5 wt %, or from 7.0 to 9.0 wt %, based on the sum weight of the interpolymer. In a further embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition comprises one ethylene/alpha-olefin/non-conjugated diene interpolymer (first interpolymer), and has an ethylene content from 40 to 70 wt %, or from 45 to 65 wt %, or from 50 to 60 wt %, based on the sum weight of the interpolymer. In a further embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition comprises one ethylene/alpha-olefin/non-conjugated diene interpolymer (first interpolymer), and has an alpha-olefin content from 30 to 50 wt %, or from 35 to 45 wt %, or from 30 to 40 wt %, based on the weight of the interpolymer. In a further embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition comprises two ethylene/alpha-olefin/non-conjugated diene interpolymers, and each interpolymer has a diene content from 6.0 to 10.0 wt %, or from 6.5 to 9.5 wt %, or from 7.0 to 9.0 wt %, based on the weight of the interpolymer. In a further embodiment, each interpolymer has the same alpha-olefin. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition.

In one embodiment, or in combination with any one or more embodiments described herein, the first composition comprises two ethylene/alpha-olefin/non-conjugated diene interpolymers, and each interpolymer has an ethylene content from 40 to 70 wt %, or from 45 to 65 wt %, or from 50 to 60 wt %, based on the weight of the interpolymer. In a further embodiment, each interpolymer has the same alpha-olefin. In a further embodiment, the first composition comprises ≥95 wt %, or ≥96 wt % or ≥97 wt %, or ≥98%, or ≥99 wt % of the sum of first ethylene/alpha-olefin/non-conjugated diene interpolymer and a second ethylene/alpha-olefin/non-conjugated diene interpolymer, based on the weight of the first composition.

In one embodiment or in combination with any one or more embodiments described herein, the composition comprises ≥95 wt %, or ≥96 wt % or ≥97 wt %, or ≥98 wt %, or ≥99 wt % of the first composition, based on the weight of the composition.

In one embodiment, or in combination with any one or more embodiments described herein, the first composition further comprises a second ethylene/alpha-olefin/non-conjugated diene interpolymer, and wherein the second ethylene/alpha-olefin/non-conjugated diene interpolymer differs from the first ethylene/alpha-olefin/non-conjugated diene interpolymer in one or more of the following properties, $Mw_{conv}$, $Mn_{conv}$, $MWD_{conv}$, MV (ML1+4, 125° C.), wt % diene (based on the weight of the interpolymer), and/or wt % ethylene (based on the weight of the interpolymer). In a further embodiment, each interpolymer has the same alpha-olefin.

In one embodiment, or in combination with any one or more embodiments described herein, the second ethylene/alpha-olefin/non-conjugated diene interpolymer differs from the first ethylene/alpha-olefin/non-conjugated diene interpolymer in one or more of the following properties, $Mw_{conv}$, $Mn_{conv}$, $MWD_{conv}$, and/or MV (ML1+4, 125° C.), or in one or more of the following properties, $Mw_{conv}$, $Mn_{conv}$, and/or $MWD_{conv}$, or in $Mw_{conv}$. In a further embodiment, each interpolymer has the same alpha-olefin.

In one embodiment, or in combination with any one or more embodiments described herein, the first ethylene/α-olefin/non-conjugated diene interpolymer is an EPDM. In a further embodiment, the diene is ENB.

In one embodiment, or in combination with any one or more embodiments described herein, the second ethylene/α-olefin/non-conjugated diene interpolymer is an EPDM. In a further embodiment, the diene is ENB.

In one embodiment, or in combination with any one or more embodiments described herein, the first composition comprises ≥95 wt %, or ≥96 wt % or ≥97 wt %, or ≥98 wt %, or ≥99 wt % of the first ethylene/alpha-olefin/non-conjugated diene interpolymer and the second ethylene/alpha-olefin/non-conjugated diene interpolymer, based on the weight of the first composition.

In one embodiment, or in combination with any one or more embodiments described herein, the composition has a Mooney Viscosity (1+4, 100° C.) from 50 to 100, or from 55 to 95, or from 60 to 90.

In one embodiment, or in combination with any one or more embodiments described herein, the composition further comprises an oil.

In one embodiment, or in combination with any one or more embodiments described herein, the weight ratio of the first composition to the oil is from 2/1 to 4/1.

Oils include, but are not limited to, petroleum oils, such as paraffinic, aromatic and naphthenic oils; polyalkylbenzene oils; and organic acid monoesters.

In one embodiment, or in combination with any one or more embodiments described herein, the composition further comprises one or more fillers.

Suitable fillers include, but are not limited to, clay, calcium carbonate, talc, carbon black, and mineral fibers.

In one embodiment, or in combination with any one or more embodiments described herein, wherein the composition comprises less than 1.0 wt %, further less than 0.5 wt %, further less than 0.1 wt % of a propylene-based polymer.

In one embodiment, or in combination with any one or more embodiments described herein, wherein the composition does not contain a coupling agent, for example, an azide compound or a peroxide.

An inventive composition may comprise one or more additional additives. Suitable additives include, but are not limited to, fillers, antioxidants, UV stabilizers, flame retardants, colorants or pigments, crosslinking agents, and combinations thereof.

In one embodiment, or in combination with any one or more embodiments described herein, the composition further comprises a crosslinking agent. Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; and peroxides, such as di-tert-butyl peroxide, tertbutylcumyl peroxide, dicumyl peroxide, 2,5-dimethyl-2,5-di-(tertbutylperoxy) hexane, di-(tertbutylperoxy-isopropyl)benzene, tertbutyl peroxybenzoate and 1,1-di-(tertbutylperoxy)-3,3,5-trimethyl-cyclohexane.

The invention also provides a crosslinked composition formed from an inventive composition of one or more embodiments described herein.

In one embodiment, or in combination with any one or more embodiments described herein, an inventive composition further comprises a thermoplastic polymer. Polymers, include, but are not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene/α-olefin interpolymers, and homogeneously branched substantially linear ethylene/α-olefin interpolymers (that is homogeneously branched long chain branched ethylene/α-olefin interpolymers).

In one embodiment, or in combination with any one or more embodiments described herein, the composition comprises greater than, or equal to, 70 weight percent, or greater than, or equal to, 75 weight percent, or greater than, or equal to, 80 weight percent, of the first composition, based on the weight of the composition. In a further embodiment, the first composition comprises greater than, or equal to, 70 weight percent, or greater than, or equal to, 75 weight percent, or greater than, or equal to, 80 weight percent, of the sum of the first and second ethylene/alpha-olefin/non-conjugated diene interpolymers, based on the weight of the first composition. In a further embodiment, each ethylene/α-olefin/non-conjugated diene interpolymer is an EPDM. In a further embodiment, each diene is ENB.

The invention also provides an article comprising at least one component formed from an inventive composition of one embodiment, or a combination of two or more embodiments, described herein.

Ethylene/α-Olefin/Non-Conjugated Polyenes Interpolymers

Each ethylene/α-olefin/non-conjugated diene interpolymer, for the first composition described herein, comprise, independently, in polymerize form, ethylene, an α-olefin, and a non-conjugated diene. Suitable examples of α-olefins include the C3-C20 α-olefins, further C3-C10 α-olefins, and preferably propylene. Suitable examples of non-conjugated polyenes include the C4-C40 non-conjugated dienes.

For each interpolymer, independently, the α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/diene (EPDM) terpolymer. In a further embodiment, the diene is 5-ethylidene-2-norbornene (ENB).

For each interpolymer, independently, illustrative non-conjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclo-dodecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a non-conjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, or in combination with any one or more embodiments described herein, the first ethylene/α-olefin/non-conjugated diene interpolymer comprises a majority amount of polymerized ethylene, based on the weight of the interpolymer. In a further embodiment, the ethylene/α-olefin/diene interpolymer is an EPDM. In a further embodiment, the diene is ENB.

In one embodiment, or in combination with any one or more embodiments described herein, the second ethylene/α-olefin/non-conjugated diene interpolymer comprises a majority amount of polymerized ethylene, based on the weight of the interpolymer. In a further embodiment, the ethylene/α-olefin/diene interpolymer is an EPDM. In a further embodiment, the diene is ENB.

In one embodiment, or in combination with any one or more embodiments described herein, both first and second ethylene/α-olefin/non-conjugated diene interpolymers, independently, comprise a majority amount of polymerized ethylene, based on the weight of the interpolymer. In a further embodiment, each ethylene/α-olefin/diene interpolymer is an EPDM. In a further embodiment, each diene is ENB.

In one embodiment, or in combination with any one or more embodiments described herein, the first ethylene/α-olefin/non-conjugated diene interpolymer is an EPDM. In a further embodiment, the diene is ENB.

In one embodiment, or in combination with any one or more embodiments described herein, the first ethylene/α-olefin/non-conjugated diene interpolymer has density from 0.860 to 0.900 g/cc, or from 0.860 to 0.890 g/cc, or from 0.860 to 0.880 g/cc, or 0.860 to 0.870 g/cc (1 cc=1 cm$^3$). In a further embodiment, the interpolymer is an EPDM. In a further embodiment, the diene is ENB.

In one embodiment, or in combination with any one or more embodiments described herein, the first ethylene/α-olefin/non-conjugated diene interpolymer has a weight average molecular weight (Mw) greater than, or equal to, 200,000 g/mole, or greater than, or equal to, 220,000 g/mole, or greater than, or equal to, 240,000 g/mole, or greater than, or equal to, 260,000 g/mole, or greater than, or equal to, 280,000 g/mole. In a further embodiment, the interpolymer is an EPDM. In a further embodiment, the diene is ENB.

In one embodiment, or in combination with any one or more embodiments described herein, the first ethylene/α-olefin/non-conjugated diene interpolymer has a weight average molecular weight (Mw) less than, or equal to, 500,000 g/mole, or less than, or equal to, 450,000 g/mole, or less than, or equal to, 400,000 g/mole. In a further embodiment, the interpolymer is an EPDM. In a further embodiment, the diene is ENB.

The first ethylene/alpha-olefin/diene interpolymer may comprise a combination of two or more embodiments as described herein.

In one embodiment, or in combination with any one or more embodiments described herein, the second ethylene/α-olefin/non-conjugated diene interpolymer is an EPDM. In a further embodiment, the diene is ENB.

In one embodiment, or in combination with any one or more embodiments described herein, the second ethylene/α-olefin/non-conjugated diene interpolymer has density from 0.860 to 0.900 g/cc, or from 0.860 to 0.890 g/cc, or from 0.860 to 0.880 g/cc, or from 0.860 to 0.870 g/cc (1 cc=1 cm$^3$). In a further embodiment, the interpolymer is an EPDM. In a further embodiment, the diene is ENB.

The second ethylene/alpha-olefin/diene interpolymer may comprise a combination of two or more embodiments as described herein.

First Composition

In one embodiment, or in combination with any one or more embodiments described herein, each ethylene/α-olefin/non-conjugated polyene interpolymer is an EPDM. In a further embodiment, the diene is ENB.

In one embodiment, or in combination with any one or more embodiments described herein, the first composition has a weight average molecular weight (Mw) greater than, or equal to, 90,000 g/mole, or greater than, or equal to, 100,000 g/mole, or greater than, or equal to, 110,000 g/mole, or greater than, or equal to, 120,000 g/mole. Mw is determined from conventional GPC.

In one embodiment, or in combination with any one or more embodiments described herein, the first composition has a weight average molecular weight (Mw) less than, or equal to, 320,000 g/mole, or less than, or equal to, 310,000 g/mole, or less than, or equal to, 290,000 g/mole, or less than, or equal to, 280,000 g/mole, or less than, or equal to, 270,000 g/mole, or less than, or equal to, 260,000 g/mole. Mw is determined from conventional GPC.

In one embodiment, or in combination with any one or more embodiments described herein, the first composition has a weight average molecular weight (Mw) less than, or equal to, 300,000 g/mole, or less than, or equal to, 250,000 g/mole, or less than, or equal to, 200,000 g/mole. Mw is determined from conventional GPC.

In one embodiment, or in combination with any one or more embodiments described herein, the first composition has a number average molecular weight (Mn) greater than, or equal to, 20,000 g/mole, or greater than, or equal to, 25,000 g/mole, or greater than, or equal to, 30,000 g/mole. Mn is determined from conventional GPC.

In one embodiment, or in combination with any one or more embodiments described herein, the first composition has a number average molecular weight (Mn) less than, or equal to, 60,000 g/mole, or less than, or equal to, 55,000 g/mole, or less than, or equal to, 50,000 g/mole. Mn is determined from conventional GPC.

In one embodiment, or in combination with any one or more embodiments described herein, the first composition has a z average molecular weight (Mz) greater than, or equal to, 300,000 g/mole, or greater than, or equal to, 350,000 g/mole, or greater than, or equal to, 400,000 g/mole. Mz is determined from conventional GPC.

In one embodiment, or in combination with any one or more embodiments described herein, the first composition has a z average molecular weight (Mz) less than, or equal to, 800,000 g/mole, or less than, or equal to, 750,000 g/mole, or less than, or equal to, 700,000 g/mole. Mz is determined from conventional GPC.

In one embodiment, or in combination with any one or more embodiments described herein, the first composition has a MWD less than, or equal to, 10.00, further less than, or equal to, 9.50, further less than, or equal to, 9.00. In a further embodiment, each ethylene/α-olefin/non-conjugated diene interpolymer is an EPDM. In a further embodiment, the diene is ENB. MWD is determined from conventional GPC.

In one embodiment, or in combination with any one or more embodiments described herein, the first composition has a MWD greater than, or equal to, 3.50, or greater than, or equal to, 3.55, or greater than, or equal to, 3.60. In a further embodiment, each ethylene/α-olefin/non-conjugated polyene interpolymer is an EPDM. In a further embodiment, the diene is ENB. Mz is determined from conventional GPC.

In one embodiment, or in combination with any one or more embodiments described herein, the first composition has a viscosity at 0.1 rad/sec, 190° C., greater than, or equal to, 45,000 Pa·s, or greater than, or equal to, 50,000 Pa·s, or greater than, or equal to, 55,000 Pa·s. In a further embodiment, each ethylene/α-olefin/diene interpolymer is an EPDM. In a further embodiment, the diene is ENB. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/-alpha-olefin/non-conjugated diene interpolymer, based on the weight of the first composition.

In one embodiment, or in combination with any one or more embodiments described herein, the first composition has a viscosity at 0.1 rad/sec, 190° C., less than, or equal to, 80,000 Pa·s, or less than, or equal to, 75,000 Pa·s, or less than, or equal to, 70,000 Pa·s, or less than, or equal to, 65,000 Pa·s, or less than, or equal to, 60,000 Pa·s. In a further embodiment, the each ethylene/α-olefin/diene interpolymer is an EPDM. In a further embodiment, the diene is ENB. In a further embodiment, the first composition comprises ≥95 wt %, or ≥96 wt % or ≥97 wt %, or ≥98%, ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, or ≥99 wt % of the first ethylene/alpha-olefin/non-conjugated diene interpolymer, based on the weight of the first composition.

In one embodiment, or in combination with any one or more embodiments described herein, the first composition has a rheology ratio (V0.1/V100 at 190° C.) greater than, or equal to, 10, or greater than, or equal to, 15, or greater than, or equal to, 20. In a further embodiment, each ethylene/α-olefin/diene interpolymer is an EPDM. In a further embodiment, the diene is ENB. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, ≥99 wt % of the first ethylene/-alpha-olefin/non-conjugated diene interpolymer, based on the weight of the first composition.

In one embodiment, or in combination with any one or more embodiments described herein, the first composition has a rheology ratio (V0.1/V100 at 190° C.) less than, or equal to, 50, or less than, or equal to, 45, or less than, or equal to, 40. In a further embodiment, each ethylene/α-olefin/diene interpolymer is an EPDM. In a further embodiment, the diene is ENB. In a further embodiment, the first composition comprises ≥95 wt %, or ≥96 wt % or ≥97 wt %, or ≥98%, or ≥99 wt % of the sum of the first ethylene/alpha-olefin/non-conjugated diene interpolymer and a second ethylene/alpha-olefin/non-conjugated diene interpolymer, based on the weight of the first composition. In another embodiment, the first composition comprises ≥95 wt %, or ≥96 wt % or ≥97 wt %, or ≥98%, ≥99 wt % of the first ethylene/-alpha-olefin/non-conjugated diene interpolymer, based on the weight of the first composition.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is ≥5.0 percent, or ≥7.0, or ≥10.0 percent, or ≥12.0, or ≥15.0 percent, as determined by 13C NMR. In a further embodiment, each ethylene/α-olefin/diene interpolymer is an EPDM. In a further embodiment, the diene is ENB. In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is ≤30.0 percent, or ≤25.0, or ≤20.0 percent, as determined by 13C NMR. In a further embodiment, each ethylene/α-olefin/diene interpolymer is an EPDM. In a further embodiment, the diene is ENB.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is from 5.0 to, 30.0 percent, or from 10.0 to 25.0 percent, or from 15.0 to 20.0 percent, as determined by 13C NMR. In a further embodiment, each ethylene/α-olefin/diene interpolymer is an EPDM. In a further embodiment, the diene is ENB.

In one embodiment, the first composition comprises ≥95 wt %, or ≥96 wt % or ≥97 wt %, or ≥98 wt %, or ≥99 wt %≥, of the first ethylene/alpha-olefin/non-conjugated diene interpolymer and a second ethylene/alpha-olefin/non-conjugated diene interpolymer, based on the weight of the first composition. In a further embodiment, each ethylene/α-olefin/diene interpolymer is an EPDM. In a further embodiment, the diene is ENB.

In another embodiment, the first composition comprises ≥95 wt %, or ≥96 wt % or ≥97 wt %, or ≥98%, or ≥99 wt % of the first ethylene/-alpha-olefin/non-conjugated diene interpolymer, based on the weight of the first composition.

In one embodiment, the first composition comprises from 40 to 80 weight percent ethylene, or from 45 to 75 weight percent ethylene, based on the weight of the first composition. In a further embodiment, each ethylene/α-olefin/diene interpolymer is an EPDM. In a further embodiment, the diene is ENB.

In one embodiment, the first composition has density from 0.860 to 0.900 g/cc, or from 0.860 to 0.890 g/cc, or from 0.860 to 0.880 g/cc, or from 0.860 to 0.870 g/cc (1 cc=1 cm$^3$). In a further embodiment, each ethylene/α-olefin/diene interpolymer is an EPDM. In a further embodiment, the diene is ENB.

The first composition may comprise a combination of two or more embodiments as described herein.

Applications

The invention also provides an article comprising at least one component formed from an inventive composition of one or more embodiments described herein. Articles include, but are not limited to, foams, sheets, molded goods, and extruded parts. Additional articles include automotive parts, weather strips, belts, hoses, wire and cable jacketing, flooring materials, gaskets, tires, computer parts, building materials and footwear components. A skilled artisan can readily augment this list without undue experimentation. In one embodiment, the article is an automotive part.

An inventive article may comprise a combination of two or more embodiments described herein.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "first composition," as used herein, includes the material(s), which comprise the first composition, as well as reaction products and decomposition products formed from the materials of the first composition. Any reaction product or decomposition product is typically present in trace or residual amounts. The first composition may contain, for example, one ethylene/α-olefin/non-conjugated polyene interpolymer, or may contain one such interpolymer and one or more additives. The first composition may contain two or more different ethylene/α-olefin/non-conjugated polyene interpolymers, or may contain such interpolymers and one or more additives.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene-based interpolymer," as used herein, refers to a polymer that comprises, in polymerized form, a 50 wt % or a majority weight percent of ethylene (based on the weight of the interpolymer), and at least one comonomer.

The term "ethylene/α-olefin/non-conjugated diene interpolymer," as used herein, refers to a polymer that comprises, in polymerized form, ethylene, an α-olefin, and a non-conjugated diene. In one embodiment, the "ethylene/α-olefin/non-conjugated polyene interpolymer" comprises a majority weight percent of ethylene (based on the weight of the interpolymer).

The term "ethylene/propylene/non-conjugated diene terpolymer," as used herein, refers to a polymer that comprises, in polymerized form, ethylene, an α-olefin, and a non-conjugated diene, as the only monomer types. In one embodiment, the "terpolymer" comprises a majority weight percent of ethylene (based on the weight of the terpolymer).

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples that are measured for density are prepared according to ASTM D-1928. Within one hour of sample pressing, measurement are made using ASTM D-792, Method B.

Melt Index

Melt index ($I_2$) is measured in accordance with ASTM-D 1238, Condition 190° C./2.16 kg, and is reported in grams eluted per 10 minutes.

Conventional Gel Permeation Chromatography (Cony. GPC)

A GPC-IR high temperature chromatographic system from, PolymerChAR (Valencia, Spain), was equipped with a Precision Detectors (Amherst, Mass.), 2-angle laser light scattering detector Model 2040, an IR5 infra-red detector and a 4-capillary viscometer, both from PolymerChAR. Data collection was performed using PolymerChAR Instrument Control software and data collection interface. The system was equipped with an on-line, solvent degas device and pumping system from Agilent Technologies (Santa Clara, Calif.).

Injection temperature was controlled at 150 degrees Celsius. The columns were three 10-micron "Mixed-B" columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was 200 microliters, and the flow rate was one milliliters/minute. The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV\ integration\ start}^{i=RV\ integration\ end} (IR_{measurement\ channel_i})}{\sum_{i=RV\ integration\ start}^{i=RV\ integration\ end} (IR_{measurement\ channel_i}/\text{Log}M_{PE_i})} \quad \text{(Eqn. 2)}$$

$$Mw(conv\ gpc) = \frac{\sum_{i=RV\ integration\ start}^{i=RV\ integration\ end} (\text{Log}M_{PE_i} IR_{measurement\ channel_i})}{\sum_{i=RV\ integration\ start}^{i=RV\ integration\ end} (IR_{measurement\ channel_i})} \quad \text{(Eqn. 3)}$$

$$Mz(conv\ gpc) = \frac{\sum_{i=RV\ integration\ start}^{i=RV\ integration\ end} (\text{Log}M_{PE_i^2} IR_{measurement\ channel_i})}{\sum_{i=RV\ integration\ start}^{i=RV\ integration\ end} (\text{Log}M_{PE_i} IR_{measurement\ channel_i})} \quad \text{(Eqn. 4)}$$

In Equations 2-4, the RV is the column retention volume (linearly-spaced), collected at "1 point per second," the IR is the baseline-subtracted IR detector signal, in Volts, from the IR5 measurement channel of the GPC instrument, and Log $M_{PE}$ is derived from the polyethylene-equivalent MW determined from Equation 1. Data calculation were performed using "GPC One software (version 2.013H)" from PolymerChAR.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity η*, tan delta, and phase angle were determined. The viscosities V0.1 at 190° C. and V100 at 190° C., and rheology ratio (V0.1/V100 at 190° C.; also referred to as "RR") were recorded. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes.

13C NMR Method for EPDM Composition Analysis

The samples were prepared by adding approximately "2.6 g of a 50/50 mixture of tetrachloroethane-d2/orthodichlorobenzene containing 0.025M in chromium acetylacetonate (relaxation agent)" to "0.2 g sample" in a "10 mm" NMR tube. The samples were dissolved and homogenized by heating the tube and its contents to 150° C. The data were collected using a Bruker 400 MHz spectrometer, equipped with a Bruker Dual DUL high-temperature CryoProbe. The data was acquired using 160 scans per data file, a 6 second pulse repetition delay, with a sample temperature of 120° C. The acquisition was carried out using a spectral width of 25,000 Hz and a file size of 32K data points.

NMR spectral analyses of the composition of the examples were carried out using the following analysis method. Quantitation of monomers present in EPDM can be calculated using the following equations (1A through 9A).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2},$$ Equation 1A $$molesENB = CH3(13.6 - 14.7 \text{ ppm}),$$ Equation 2A $$molesP = CH3(19.5 - 22.0 \text{ ppm}),$$ Equation 3A $$mole \% \text{ ethylene} = \frac{100*molesE}{molesE + molesP + molesENB},$$ Equation 4A $$mole \% \text{ propylene} = \frac{100*moles}{molesE + molesP + molesENB},$$ Equation 5A $$mole \% \text{ ENB} = \frac{100*molesENB}{molesE + molesP + molesENB},$$ Equation 6A $$Wt \% \text{ ethylene} = \frac{100*moles \% E*28}{mole \% E*28 + mole \% P*42 + moleENB*120},$$ Equation 7A $$Wt \% \text{ propylene} = \frac{100*mole \% P*42}{mole \% E*28 + mole \% P*42 + mole \% ENB*120},$$ Equation 8A $$Wt \% \text{ ENB} = \frac{100*mole \% ENB*120}{mole \% E*28 + mole \% P*42 + mole \% ENB*120}.$$ Equation 9A Further NMR spectral analysis of the inventive first compositions displays a peak area, from 21.3 ppm to 21.8 ppm (% PP Tacticity Marker), greater than 5.0% (further greater than 10.0%) of the total integral area from 19.5 ppm to 22.0 ppm. Similar spectral analysis of some comparative compositions, show less than 3.0% of the total integral area from 19.5 ppm to 22.0 ppm. Spectral data are referenced to the EEE backbone at 30 ppm. Peak responses in this region have been typically related to differences in propylene tacticity incorporated into the polymer. A similar analysis can be done for another type of ethylene/α-olefin/non-conjugated polyene interpolymer.

Further NMR spectral analysis of some EPDMs displayed a peak area (corresponding to $CH_3$ of the aliphatic chain end) from chemical shift region 14.0 to 14.3 ppm, which when the total integrated area (chemical shift region 1 to 55 ppm) is set to a value of 1000, integrates to a peak area greater than 0.5 (>0.5 chain ends per 1000 carbons, ACE). Similar spectral analysis of other EPDMs showed less than 0.5 ACE or non detected of the total integral area from 10 to 55 ppm. Spectral data were referenced to the EEE backbone at 30 ppm. Peak responses in this region typically are related to differences in chain ends that have been incorporated into the EPDM. A similar analysis can be done for another type of ethylene/α-olefin/non-conjugated polyene interpolymer.

Mooney Viscosity

Mooney Viscosity (ML1+4 at 100° C., or 125° C.) and Mooney Stress Relaxation were measured in accordance with ASTM 1646, with a one minute preheat time and a four minute rotor operation time, using the Large rotor. The instrument is an Alpha Technologies Mooney Viscometer 2000.

The viscosity of each formulated compositions was measured using an uncured blanket (see experimental section), so that the viscosity of the uncured composition could be examined. Samples were conditioned for 24 hours at room temperature, prior to testing. Mooney relaxation area was determined by suddenly stopping the rotor at the end of the Mooney viscosity test, and observing the torque as it decays. The collection of data started one second after stopping the rotor, and continued until 100 seconds had passed, since the rotor was stopped. The area under the torque-time curve ("MLRA") is indicative of the amount of stored elastic energy in the polymer.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. t5 is a "five Mooney unit" increase in viscosity). The total test time was 30 minutes, with a 1 minute preheat time. The viscosity of each composition was measured from uncured blanket, cured in the viscometer, so that the scorch properties could be examined. Samples were conditioned for at least 24 hours at room temperature, prior to testing.

RPA Analysis

Curing characteristics of each formulation were measured in accordance to ASTM D-6204, using an Alpha Technologies Rheometer RPA 2000P. The rheology of each formulated composition was measured from samples of uncured blanket, which was then cured during the RPA analysis. Samples were conditioned for at least 24 hours, at room temperature, prior to testing. The RPA test was carried out at 160° C. and 180° C., over a 25 minutes. The RPA die oscillating frequency was set at 100 cycle per minute (CPM), shear strain was set at 7%. The visco-elastic properties, such as minimum torque (ML), maximum torque (MH), tan delta at minimum torque, tan delta at maximum torque, and time to reach a certain percentage of the torque at the end of the test or the maximum torque, whichever is higher (for example, tc95 corresponds to the time in minutes to reach the 95% of the torque at the end of the test or the maximum torque, whichever is higher), were measured during the cure cycle.

EXPERIMENTAL

The following examples illustrate the present invention but are not intended to limit the scope of the invention. Materials are shown in Table 1.

TABLE 1

Materials information

| Component | Brand name | Characteristic | Supplier |
|---|---|---|---|
| Inventive example | NORDEL | EPDM | DOW |
| EPT 4045 | MITSUI EPT | EPDM | Mitsui |
| ETP 4045 M | MITSUI EPT | EPDM | Mitsui |
| ZnO | RHENOGRAN ® ZNO-85 | activator | Rheinchemie |
| Stearic acid | Stearic acid | activator | National pharm |
| PEG 3350 | Carbowax | process aid | DOW |
| TMQ | VULKANOX HS/LG | antioxidant | Lanxess |
| Carbon black N-550 | SPHERON 5000A | filler | Cabot |
| Carbon black N-774 | SPHERON 6400A | filler | Cabot |
| Whitening (treated) | OMYACARB | filler | Omya |
| Parafinic oil | SUNPAR 2280 | plasticizer | Sunoco |
| CaO-80 | RHENOGRAN ® CAO-80 | desiccant | Rheinchemie |
| CBS-80 | RHENOGRAN ® CBS-80 | accelerator | Rheinchemie |
| MBTS-80 | RHENOGRAN ® MBTS-75 | accelerator | Rheinchemie |
| ZDBC-80 | RHENOGRAN ® ZDBC-75 | accelerator | Rheinchemie |
| ZDEC-80 | RHENOGRAN ® ZDEC-80 | accelerator | Rheinchemie |
| TETD-80 | CUREBEAD ® PB(TETD)-75 | accelerator | Rheinchemie |
| DTDM-80 | RHENOGRAN ® DTDM-80 | accelerator | Rheinchemie |
| DPG-80 | RHENOGRAN ® DPG-80 | accelerator | Rheinchemie |
| ETU-80 | RHENOGRAN ® ETU-75 | accelerator | Rheinchemie |
| S-80 | RHENOGRAN ® S-80 | curative | Rheinchemie |

First Composition 1—Continuous Polymerization

The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3).

The first composition was produced in a solution polymerization process using a continuous stir-tanked reactor followed by loop reactor. Ethylene was introduced in a mixture of a solvent of ISOPAR E (available from Exxon-Mobil), propylene was introduced and 5-ethylidene-2-norbornene (ENB) was introduced, each forming a reactor feed stream. Catalyst was fed to each the reactor separately, and activated in-situ using co-catalyst 1 and co-catalyst 2.

The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent such as hydrogen.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. See also U.S. Pat. Nos. 5,977,251 and 6,545,088, and the references therein.

Monomer feed rate and polymerization temperature and other conditions are listed in below in Tables 2A and 2B. Properties of the first composition 1 are shown in Tables 3-6. Comparative compositions are also listed in Tables 4-6.

TABLE 2A

Reaction Conditions for First Composition 1

| | Reactor Volume, [gal] | Reactor Temp. [deg C.] | Pressure [psig] | Solvent Feed [lb/hr] | Ethylene Feed [lb/hr] | Propylene Feed [lb/hr] | ENB Feed [lb/hr] | H2 Mol % | C2 Concen. [g/L] |
|---|---|---|---|---|---|---|---|---|---|
| EPDM-R1 (reactor 1) | 24.1 (CSTR) | 103.30 | 638.98 | 140.0 | 9.18 | 10.83 | 3.07 | 0.019 | 9.26 |
| EPDM | 30.6 (Loop) | 157.98 | 625.25 | 39.9 | 13.65 | 26.15 | 4.27 | 2.10 | 11.03 |

TABLE 2B

Reaction Conditions for First Composition 1

| | Catalyst* Efficiency [lb_poly/lb_metal]*10E6 | Cat. Flow [lb/hr] | Catalyst Solution Conc. (ppm) | Cocat-1** Flow [lb/hr] | Cocat-1 Solution Conc. ppm | Cocat-2*** Flow [lb/hr] | Cocat-2 Solution Conc. [ppm] | Production Rate [lb/hr] |
|---|---|---|---|---|---|---|---|---|
| EPDM-R1 (reactor 1) | 0.61 | 0.76 | 29.91 | 1.16 | 259.76 | 0.24 | 996.31 | 13.95 |
| EPDM | 0.43 | 0.34 | 159.92 | 0.36 | 1999.94 | 0.65 | 996.31 | 23.01 |

*Catalyst is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2 (modified methylalumoxane (MMAO)) was purchased from Akzo Nobel, and used without further purification.

TABLE 3

First Composition 1

| Component | wt % split | Mooney Viscosity ML@125° C. | $Mw_{conv}$ (g/mol) | C2 wt % | ENB wt % |
|---|---|---|---|---|---|
| Overall | | 33 | 155359 | 55 | 8.5 |
| Reactor-1 | 35 | | 300000 | | |

TABLE 4

First Compositions Properties

| Molecular weight and distribution ($GPC_{conv}$) | First Composition 1 | Comparative First Composition 1 (Mitsui EPT 4045) | Comparative First Composition 2 (Mitsui EPT 4045M) |
|---|---|---|---|
| Mn (g/mole) | 43,155 | 33,845 | 45,748 |
| Mw (g/mole) | 155,359 | 130,214 | 108,884 |
| Mz (g/mole) | 439,319 | 418,646 | 204,179 |
| MWD | 3.60 | 3.8 | 2.38 |
| Ethylene % | 55 | 55.9 | 49.5 |
| ENB % | 8.5 | 6.9 | 4.7 |
| Viscosity @ 0.1 rad/s, 190° C. (Pa · s)* | 58,580 | 30557 | 38188 |
| Rheology Ratio V0.1/V100* | 33 | 14 | 16 |
| tanDelta @ 0.1 rad/s, 190° C. (Pa · s)* | 1.22 | 2.27 | 2.22 |
| [(Mz)/(tan delta (0.1 rad/sec, 190° C.))] (g/mole) | 360,098 | 184,426 | 91,973 |
| Tm (° C.) | −12 | −21.5 | −18.5 |
| Tg (° C.) | Approx. −45 | −51.5 | −48.5 |

*No oil.

As see in Table 4, the first composition 1 has a broader MWD compared with the comparative first composition 2 (metallocene type reference EPDM2 (Mitsui EPT 4045M)), and similar MWD to comparative first composition 1 (Ziegler-Natta type EPDM1 (Mitsui EPT 4045)). The first composition 1 also had a much low loss factor (tan delta), especially at low shear rate, which indicates a superior melt elasticity, as compared with two comparative first compositions.

Additional rheological properties are shown in Tables 5 and 6. As seen in these tables, the first composition has a higher Mooney viscosity than the comparatives, but due to its high molecular weight and high branching, the MLRA of the first composition is significantly higher (296 versus 206 and 148) than the comparatives. As seen from the normalized Mooney viscosity basis (MLRA/ML), the first composition has a higher ratio of 5.65 versus 4.58, and 3.15, respectively to the comparative first compositions. The higher MLRA/ML ratio indicates that the first composition is more elastic nature, which results in its better processability; improved green strength, roll mill and calendaring stability, and improved consistency in extrusion output.

TABLE 5

Mooney Viscosity and Mooney stress relaxation area of the First Composition and Comparative First Compositions at 100° C.

| Mooney and Mooney Relaxation Test* | First Comp. 1 | Comparative First Comp. 1 (Mitsui EPT 4045) | Comparative First Comp. 2 (Mitsui EPT 4045M) |
|---|---|---|---|
| ML 1 + 4 @ 100° C. | 52.43 | 44.96 | 47.07 |
| MLRA | 296.03 | 205.84 | 148.18 |
| Slope | −0.611 | −0.641 | −0.818 |
| MLRA/ML | 5.65 | 4.58 | 3.15 |

*No oil.

TABLE 6

Mooney Viscosity and Mooney stress relaxation area of the First Composition and Comparative First Compositions at 125° C.

| Mooney and Mooney Relaxation Test* | First Composition 1 | Comparative First Composition 1 (Mitsui EPT 4045) | Comparative First Composition 2 (Mitsui EPT 4045M) |
|---|---|---|---|
| ML 1 + 4 @ 125° C. | 32.97 | 28.08 | 28.65 |
| MLRA | 147.86 | 110.58 | 95.97 |
| Slope | −0.702 | −0.674 | −0.767 |
| MLRA/ML | 4.48 | 3.94 | 3.35 |

*No oil.

An additional inventive "first composition 2" was prepared, and compared against other comparative first compositions, as shown in Table 7 below. The first compositions 1 and 2 meet the following relationship: "[(Mz)/(tan delta (0.1 rad/sec, 190° C.))]≥250,000 g/mole," which is indicative of a proper balance of high molecular weight and sufficient branching for a good balance of efficient mixing, processing, physical properties and compound green strength. Also, the first compositions 1 and 2 meet the following relationship: "[(Mz)/(tan delta (0.1 rad/sec, 190° C.))]/(MV (ML1+4, 125° C.)≥12,000 g/mole," which is indicative of a proper balance of high molecular weight and branching to provide a good balance of efficient mixing, processing, physical properties and compound green strength on a normalized Mooney viscosity basis. The higher rheology ratio of the first composition also helps to improve the polymer's processability, such as better mold filling during injection molding, and to minimize defects such as sharkskin melt fracture during extrusion.

TABLE 7

Inventive and Comparative First Compositions*

|  |  |  | EPDM 3430 | EPDM 3640 | EPDM 3720P | EPDM 3722P | EPDM 3745P | EPDM 4520 |
|---|---|---|---|---|---|---|---|---|
| Composition | % C2 |  |  | 42.0 | 55.2 | 70.2 | 70.6 | 70.3 | 56.1 |
|  | % C3 |  |  | 57.2 | 43.3 | 29.3 | 28.6 | 29.3 | 41.7 |
|  | % ENB |  |  | 0.88 | 1.50 | 0.56 | 0.82 | 0.42 | 2.29 |
| Mooney No oil | ML (1 + 4) 125° C. | MU | 27.3 | 38.6 | 19.1 | 16.9 | 45.9 | 21.0 |
| Density | Density | g/cm3 | 0.854 | 0.856 | 0.867 | 0.868 | 0.864 | 0.856 |
| Conventional GPC | Mn | g/mol | 53,690 | 45,620 | 28,350 | 24,200 | 56,440 | 59,000 |
|  | Mw | g/mol | 119,420 | 145,620 | 114,810 | 96,310 | 142,710 | 167,770 |
|  | Mz | g/mol | 221,300 | 356,300 | 358,700 | 260,800 | 273,500 | 369,100 |
|  | Mw/Mn |  | 2.22 | 3.19 | 4.05 | 3.98 | 2.53 | 2.84 |
| ARES- 190° C. | V0.1 190° C. | Pa-s | 11,870 | 4,390 | 1,819 | 4,094 | 11,459 | 8,328 |
|  | V100 190° C. | Pa-s | 379 | 228 | 122 | 112 | 326 | 311 |
|  | RR (V0.1/V100) |  | 31.3 | 19.2 | 15.0 | 36.6 | 35.1 | 26.8 |
|  | TD0.1 190° C. |  | 1.31 | 1.93 | 2.39 | 1.37 | 1.11 | 1.41 |
|  | TD100 190° C. |  | 0.55 | 0.70 | 0.83 | 0.79 | 0.70 | 0.59 |
| Elasticity Factor | Mz/TD0.1 |  | 168,665 | 185,021 | 150,159 | 190,118 | 246,694 | 261,736 |
| % PP Tacticity NMR |  |  | <3 | <3 | <3 | <3 | <3 | <3 |
| Normalized Elasticity Factor | [Mz/TD0.1]/ [MV] |  | 6,178 | 4,793 | 7,862 | 11,250 | 5,375 | 12,464 |

|  |  |  | EPDM 4640 | EPDM 4725P | EPDM 4820P | First Comp. 2 | First Comp. 1 |
|---|---|---|---|---|---|---|---|
| Composition | % C2 |  | 54.9 | 70.9 |  | 55.0 | 55 |
|  | % C3 |  | 41.4 | 24.3 |  | 36.5 |  |
|  | % ENB |  | 3.74 | 4.78 | 4.97 | 8.50 | 8.5 |
| Mooney No oil | ML (1 + 4) 125° C. | MU | 39.0 | 25.5 | 19.8 | 30.0 | 33.0 |
| Density | Density | g/cm3 |  | 0.872 | 0.907 |  |  |
| Conventional GPC | Mn | g/mol | 36,900 | 33,350 | 36,320 | 36,137 | 43,155 |
|  | Mw | g/mol | 136,090 | 121,640 | 85,090 | 184,768 | 155,359 |
|  | Mz | g/mol | 334,600 | 332,800 | 163,300 | 658,158 | 439,319 |
|  | Mw/Mn |  | 3.69 | 3.65 | 2.34 | 5.11 | 3.60 |
| ARES- 190° C. | V0.1 190° C. | Pa-s | 4,512 | 3,282 | 1,163 | 57,266 | 58,580 |
|  | V100 190° C. | Pa-s | 211 | 166 | 157 | 2,020 | 1775 |
|  | RR (V0.1/V100) |  | 21.4 | 19.8 | 7.4 | 28.3 | 33 |
|  | TD0.1 190° C. |  | 1.76 | 1.70 | 4.86 | 1.30 | 1.22 |
|  | TD100 190° C. |  | 0.69 | 0.79 | 1.17 | 0.70 | 0.71 |
| Elasticity Factor | Mz/TD0.1 |  | 189,806 | 195,713 | 33,589 | 506,275 | 360,098 |
| % PP Tacticity NMR |  |  | <3 | 2.0 | <3 | 17 | 17 |
| Normalized Elasticity Factor | [Mz/TD0.1]/ [MV] |  | 4,867 | 7,675 | 1,696 | 16,876 | 10,912 |

*No oil.

Final Compositions

Each final composition was prepared using a standard "up-side down" mix, with calcium carbonate, carbon black, oil, stearic acid and EPDM added initially in a Banbury mixer, at a rotor speed of 77 rpm, and with the rotors and chamber conditioned to 50° C. The ZnO and other curatives were added in the sweep (at 65° C.). The intermediate composition was dropped at 100° C. Mixing of this composition was completed on a 6"2 roll mill at ambient conditions, and the composition was "sheeted out" in the form of a blanket. After milling, the entire composition was cut into strips in preparation for extrusion and further testing.

Figure 2:
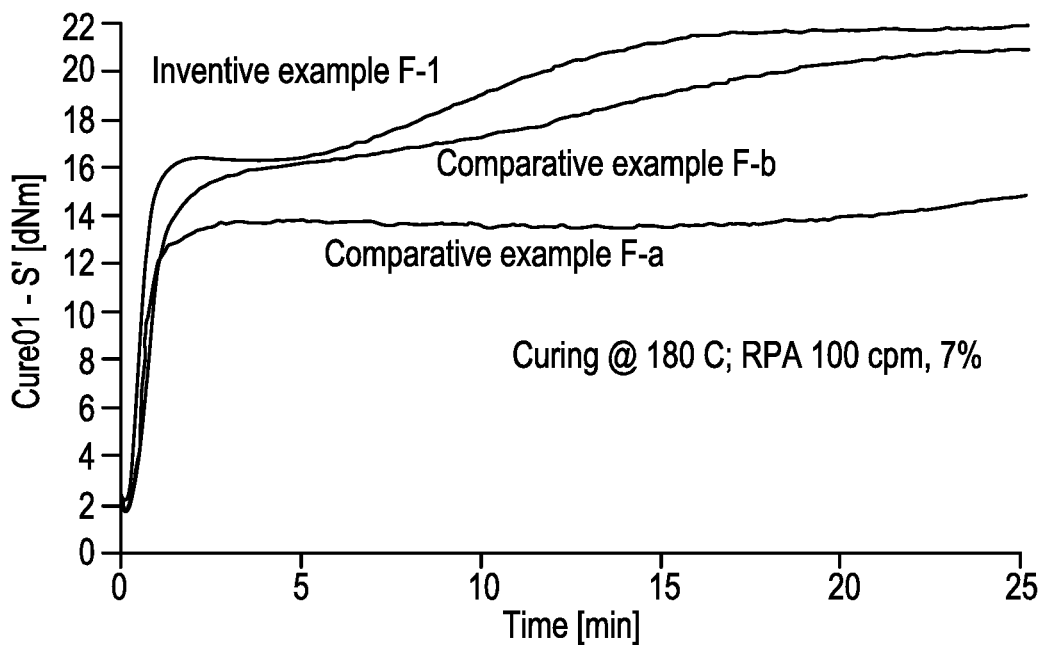
FIG. 2 depicts the curing profiles of an inventive composition and comparative compositions, each cured by RPA, at 180° C. for 25 minutes.

Final compositions are listed in Table 8 below. Properties of each composition are shown in Tables 9-12 below. Curing profiles are shown in FIGS. 1 and 2.

TABLE 8

Final Compositions (parts by weight)

|  | Inventive Composition F-1 | Comparative Composition F-a | Comparative Composition F-b |
|---|---|---|---|
| First Composition 1 | 100 |  |  |
| Comp. First Composition 1 |  | 100 |  |
| Comp. First Composition 2 |  |  | 100 |
| ZnO | 5 | 5 | 5 |
| Stearic acid | 2 | 2 | 2 |
| PEG 3350 | 2 | 2 | 2 |
| TMQ | 1 | 1 | 1 |
| Carbon black N-550 | 60 | 60 | 60 |
| Carbon black N-774 | 40 | 40 | 40 |
| Whitening (treated) | 40 | 40 | 40 |
| Parafinic oil, SUNPAR 2280 | 30 | 30 | 30 |
| CaO-80 | 6 | 6 | 6 |

TABLE 8-continued

Final Compositions (parts by weight)

|  | Inventive Composition F-1 | Comparative Composition F-a | Comparative Composition F-b |
|---|---|---|---|
| MBTS-80 | 1.5 | 1.5 | 1.5 |
| ZDBC-80 | 1.5 | 1.5 | 1.5 |
| ZDEC-80 | 1.5 | 1.5 | 1.5 |
| TETD-80 | 1 | 1 | 1 |
| DTDM-80 | 1.5 | 1.5 | 1.5 |
| ETU-80 | 1 | 1 | 1 |
| S-80 | 1 | 1 | 1 |
| Total | 295 | 295 | 295 |

TABLE 9

Mooney Viscosity and Mooney Stress Relaxation

|  | Inventive Composition F-1 | Comparative Composition F-a | Comparative Composition F-b |
|---|---|---|---|
| ML 1 + 4 @ 100° C. | 71.43 | 62.18 | 63.70 |
| MLRA | 1138.59 | 567.18 | 476.54 |
| Slope | −0.29 | −0.37 | −0.42 |
| MLRA/ML | 15.94 | 9.12 | 7.48 |

TABLE 10

Cure Characteristics of Inventive and Comparative Compositions

| Rheometer (RPA), 160° C., 0.5 degree arc | Inventive composition F-1 | Comparative composition F-a | Comparative composition F-b |
|---|---|---|---|
| ML | 2.46 | 2.25 | 1.76 |
| MH | 19.16 | 14.22 | 17.39 |
| MH − ML | 16.7 | 11.97 | 15.63 |
| tc10 | 0.59 | 0.6 | 0.9 |
| 0.1 * (MH − ML)/Tc10 | 2.83 | 2.00 | 1.74 |
| tc50 | 1.44 | 1.33 | 2.08 |
| tc90 | 7.44 | 2.94 | 5.44 |
| tc95 | 13.31 | 4.06 | 7.19 |
| Tan delta @ ML | 1.11 | 1.08 | 1.10 |
| Tan delta @ MH | 0.28 | 0.36 | 0.32 |

TABLE 11

Cure Characteristics of Inventive and Comparative Compositions

| Rheometer (RPA), 180° C., 0.5 degree arc | Inventive composition F-1 | Comparative composition F-a | Comparative composition F-b |
|---|---|---|---|
| ML (low) | 2.31 | 1.4 | 1.74 |
| MH (high) | 21.88 | 16.03 | 20.93 |
| MH − ML | 19.57 | 14.63 | 19.19 |
| tc10 | 0.34 | 0.4 | 0.47 |
| 0.1 * (MH − ML)/Tc10 | 5.76 | 3.65 | 4.08 |
| tc50 | 0.68 | 0.84 | 0.99 |
| tc90 | 11.51 | 3.63 | 14.84 |
| tc95 | 13.95 | 8.07 | 17.99 |
| Tan delta @ ML | 1.00 | 0.97 | 1.08 |
| Tan delta @ MH | 0.19 | 0.35 | 0.29 |

TABLE 12

Physical and Mechanical Properties of Inventive and Comparative Compositions

|  | Inventive composition F-1 | Comparative composition F-a | Comparative composition F-b |
|---|---|---|---|
| Density (g/cc) | 1.25 | 1.25 | 1.24 |
| Hardness (10 seconds), Sh.A | 70.7 | 70.5 | 72.9 |
| 10% modulus, MPa | 6.48 | 7.55 | 8.05 |
| 20% modulus, MPa | 5.05 | 5.87 | 5.91 |
| 30% modulus, MPa | 4.33 | 5.02 | 4.91 |
| 40% modulus, MPa | 3.94 | 4.54 | 4.35 |
| 50% modulus, MPa | 3.72 | 4.26 | 4.01 |
| 100% modulus, MPa | 3.54 | 3.86 | 3.5 |
| 200% modulus, MPa | 3.34 | 3.39 | 3.03 |
| Tensile strength, MPa | 8.34 | 11.2 | 8.4 |
| Elongation at break, % | 269.9 | 340.4 | 341.1 |
| Tear resistance (DieC), kN/m | 26.09 | 32.97 | 29.45 |

The inventive composition shows a fast cure, as seen by the higher "0.1*(MH−ML)/Tc10" values, and higher curing efficiency (higher MH−ML). The inventive composition also has a higher Mooney relaxation area (MLRA). The higher Mooney relaxation area means rubber compound has higher melt elasticity, which provides for better carbon black incorporation during mixing, and improved dimension stability during extrusion. The unique properties of the inventive first composition also help to improve processability, such as better mold filling during injection molding, and to minimize defects such as sharkskin melt fracture during extrusion. No multifunctional branching agent is needed for long chain branching for the inventive compositions. The inventive composition also has good green strength, as indicated by the low tan delta values. The inventive composition show good modulus at low deformation and good tear strength. Overall, the inventive compositions can be used to provide high green strength and low iridescent (low discoloration), which fulfills the current needs for faster rubber extrusion processes and faster injection molding processes.

Additional Comparative Compositions

Additional comparative compositions are shown in Table 13.

TABLE 13

Additional Compositions

|  | EPDM01 First Reactor* | EPDM01 Second Reactor Final* | EPDM02 Second Reactor Final* | EPDM03 Second Reactor Final* | EPDM25 First Reactor* | EPDM25 Second Reactor Final* | EPDM70 Second Reactor Final* | VISTALON 3666 |
|---|---|---|---|---|---|---|---|---|
| $Mz_{conv}$ (g/mole) | 269500 | 229100 | 371262 | 368251 | 391200 | 304200 | 339700 |  |

TABLE 13-continued

Additional Compositions

| | EPDM01 First Reactor* | EPDM01 Second Reactor Final* | EPDM02 Second Reactor Final* | EPDM03 Second Reactor Final* | EPDM25 First Reactor* | EPDM25 Second Reactor Final* | EPDM70 Second Reactor Final* | VISTALON 3666 |
|---|---|---|---|---|---|---|---|---|
| $MWD_{conv}$ | 2.20 | 2.69 | 2.13 | 2.11 | 2.69 | 3.4 | 2.38 | 3.18** |
| tanDelta @ 0.1 rad/s, 190° C. (Pa·s)*** | 0.79 | 1.27 | 1.45 | 1.58 | 1.0 | 2.0 | 1.35 | |
| [(Mz)/(tan delta (0.1 rad/sec, 190° C.))] (g/mole) | 341139 | 180394 | 256042 | 233070 | 145428 | 152100 | 251630 | >250000 |

*Compositions from International Publication WO2014/084893.
**Average of two lots.
***No oil.

The comparative compositions have a MWD less than 3.50. The second reactor compositions for EPDM01, EPDM03, EPDM25, and the EPDM25 (first reactor) have an "Mz/(tan delta (0.1 rad/sec, 190° C.)" less than 250,000 g/mole. Thus, these comparative compositions would not have the balance of good mixing and good physical properties (as indicated by higher $MWD_{conv}$ and $Mz_{conv}$), and high elasticity, as indicated by [(Mz)/(tan delta (0.1 rad/sec, 190° C.))] (from the combination of branching and molecular weight), for good processing and compound green strength.

What is claimed is:

1. A composition comprising a first composition, which comprises a first ethylene/alpha-olefin/non-conjugated diene interpolymer, and wherein the first composition comprises the following properties:
   a) a molecular weight distribution MWD(conv)≥3.50, and
   b) a [(Mz)/(tan delta (0.1 rad/sec, 190° C.))]≥250,000 g/mole.

2. The composition of claim 1, wherein the first composition has a MV (1+4, 125° C.)≤55.

3. The composition of claim 1, wherein the first composition has a tan delta (0.1 rad/sec, 190 C)≥0.9.

4. The composition of claim 1, wherein the first composition has a [(Mz)/(tan delta (0.1 rad/sec, 190° C.))]/(MV (ML1+4, 125° C.)≥9,000 g/mole.

5. The composition of claim 1, wherein the first composition has a rheology ratio RR=[V (0.1 rad/sec, 190° C.)/V (100 rad/sec, 190 C)]≥15.

6. The composition of claim 1, wherein the first composition has a tan delta (0.1 rad/sec, 190° C.)] from 0.90 to 1.50.

7. The composition of claim 1, wherein the composition comprises ≥95 wt % of the first composition, based on the weight of the composition.

8. The composition of claim 1, wherein the first composition further comprises a second ethylene/alpha-olefin/non-conjugated diene interpolymer, and wherein the second ethylene/alpha-olefin/non-conjugated diene interpolymer differs from the first ethylene/alpha-olefin/non-conjugated diene interpolymer in one or more of the following properties, $Mw_{conv}$, $Mn_{conv}$, $MWD_{conv}$, MV (ML1+4, 125° C.), wt % diene (based on the weight of the interpolymer), and/or wt % ethylene (based on the weight of the interpolymer).

9. The composition of claim 8, wherein the first composition comprises ≥95 wt % of the first ethylene/alpha-olefin/non-conjugated diene interpolymer and the second ethylene/alpha-olefin/non-conjugated diene interpolymer, based on the weight of the first composition.

10. An article comprising at least one component formed from the composition of claim 1.

* * * * *